Oct. 22, 1940.  H. L. SPAUNBURG ET AL  2,219,024
REGISTERING AND COMPUTING MECHANISM
Filed Nov. 6, 1939   5 Sheets-Sheet 1

Inventors
EDWARD A. SLYE
HARVEY L. SPAUNBURG
By Wilkinson, Huxley, Byron & Knight
Attorneys

Oct. 22, 1940.   H. L. SPAUNBURG ET AL   2,219,024
REGISTERING AND COMPUTING MECHANISM
Filed Nov. 6, 1939   5 Sheets-Sheet 3

Inventors
EDWARD A. SLYE
HARVEY L. SPAUNBURG

Oct. 22, 1940. H. L. SPAUNBURG ET AL 2,219,024
REGISTERING AND COMPUTING MECHANISM
Filed Nov. 6, 1939 5 Sheets-Sheet 4

Inventors
EDWARD A. SLYE
HARVEY L. SPAUNBURG

Oct. 22, 1940.                H. L. SPAUNBURG ET AL                2,219,024
                         REGISTERING AND COMPUTING MECHANISM
                         Filed Nov. 6, 1939           5 Sheets-Sheet 5

Inventors
EDWARD A. SLYE
HARVEY L. SPAUNBURG

Patented Oct. 22, 1940

2,219,024

UNITED STATES PATENT OFFICE 2,219,024

REGISTERING AND COMPUTING MECHANISM

Harvey L. Spaunburg, Bristol, and Edward A. Slye, East Hartford, Conn., assignors, by mesne assignments, to The Wayne Pump Company, Fort Wayne, Ind., a corporation of Maryland Application November 6, 1939, Serial No. 303,040

22 Claims. (Cl. 74—283)

This invention pertains to a computing head and more particularly to variating means therefor.

It is an object of this invention to provide a computing head wherein the setting may be readily accomplished at one station.

Another object is to provide a registering and computing device wherein small calibrations may be made by simple, rugged and inexpensive mechanism which fulfills all requirements of manufacture and service.

Still another object of the invention is to provide speed variating mechanism which is provided with means for continually effecting operative connection of the working parts, and to provide mechanism for indicating such connections.

Yet another object of the invention is to provide a computing head having simple and inexpensive daily price indicating means operable as the variator of said head is set.

A further object of the invention is to provide a horizontal variator wherein setting means is provided so arranged that different movements are necessary to disconnect and move portions of the gear trains to effect different settings thereof.

With these and various other objects in view, the invention may consist of certain novel features of construction and operation as will be more fully described and particularly pointed out in the specification, drawings and claims appended hereto.

In the drawings, which illustrate an embodiment of the device, and wherein like reference characters are used to designate like parts—

In the computing head illustrated herein, it is of course understood that said head is adapted for many uses in computing, such as in the textile and machine, etc. art. It is, however, particularly applicable to the so-called computing type of pump such as illustrated in Patent No. 2,151,239, Slye et al., granted March 21, 1939.

In a liquid dispensing apparatus in use today embodying a computing head, the liquid dispensing apparatus consists essentially of a pump the inlet side of which is adapted to be connected to a source of liquid supply, the pump being operated by suitable means such as an electric motor which may be controlled by means operable adjacent the hose hook. The outlet side of the pump may be connected through a suitable air separator to the inlet side of the meter, the liquid passing through the meter causing operation thereof, which in turn causes rotation of the so-called meter shaft, the rotation of said shaft being proportional to the amount of liquid passing through the meter. The outlet side of the meter is connected through the suitable sight gauge to the hose, which in turn is controlled by the nozzle having an operable nozzle valve therein. The meter shaft is the means of operating or controlling the operation of the computing head.

Figures 1, 2:
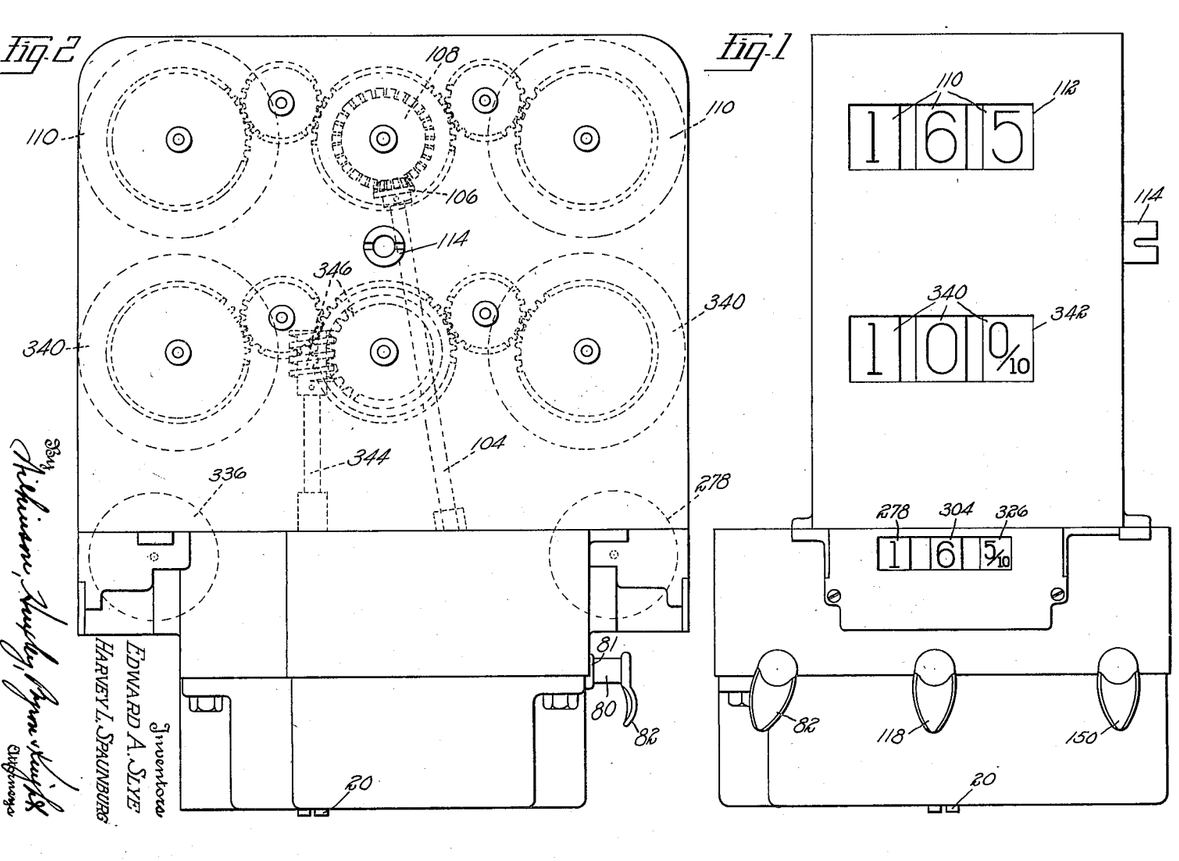
Figure 1 is a front elevation of a computing head embodying the invention.
Figure 2 is a side elevation of the computing head illustrated in Figure 1, the same looking toward the left as viewed in Figure 1.
Figure 3:
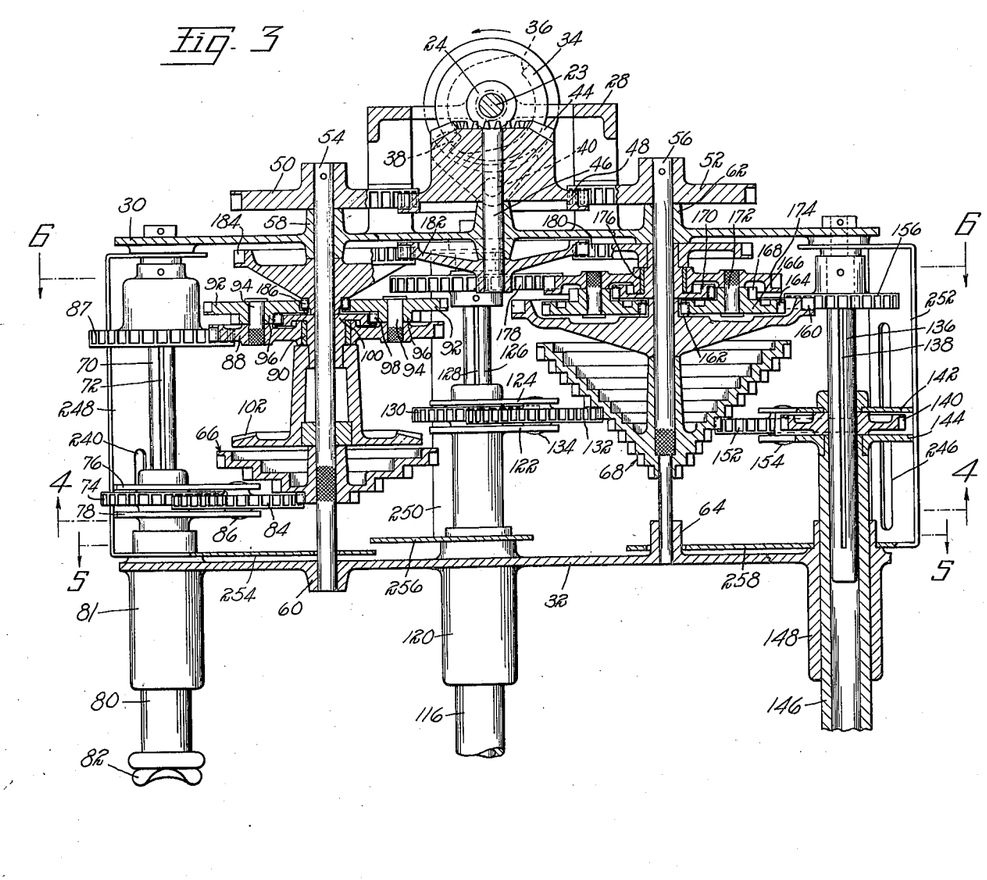
Figure 3 is a top plan view, partly in section, of the computing head illustrated in Figures 1 and 2, the same being taken through the gear cones of said variating mechanism, i. e., substantially in the plane as indicated by the lines 3—3 of Figures 4 and 6.
Figure 4:
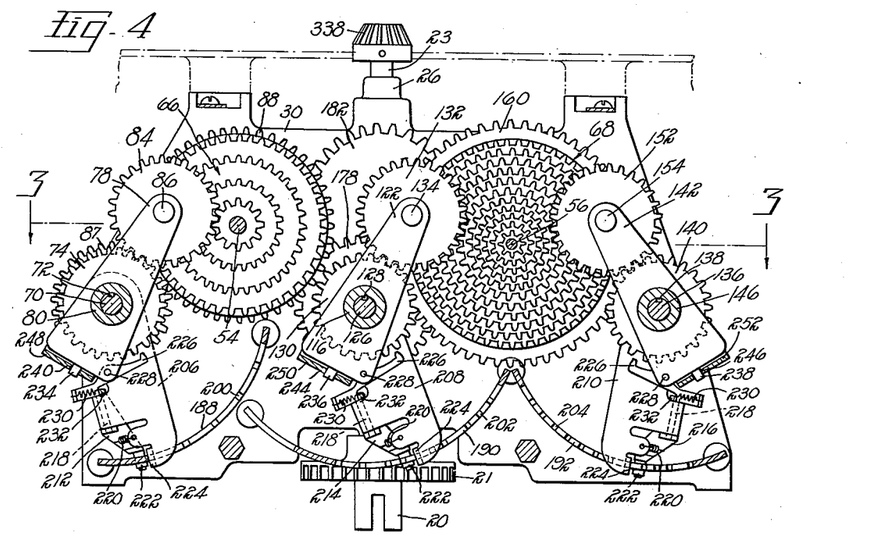
Figure 4 is a vertical elevation, partly in section, the same being taken substantially in the plane as indicated by the line 4—4 of Figure 3.
Figure 5:
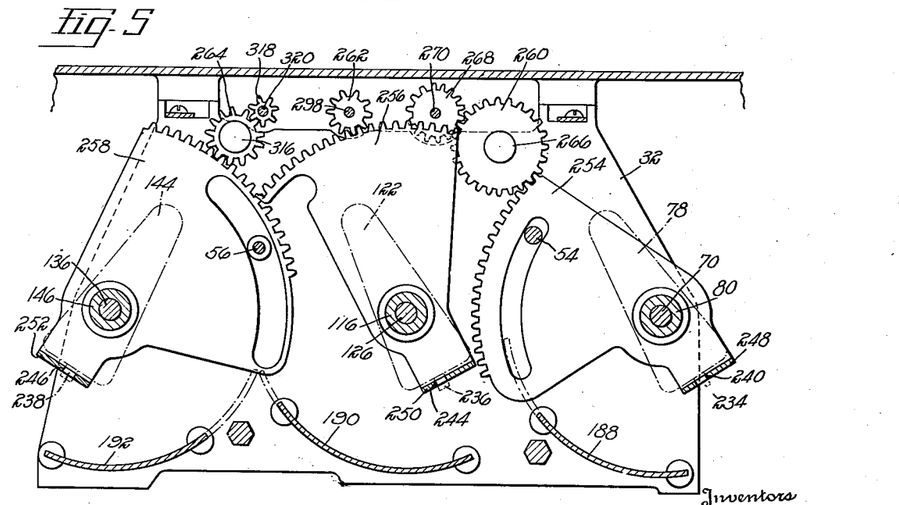
Figure 5 is an enlarged vertical sectional elevation through a portion of the daily price synchronizing means, the same being taken substantially in the plane as indicated by the line 5—5 of Figure 3.
Figure 6:
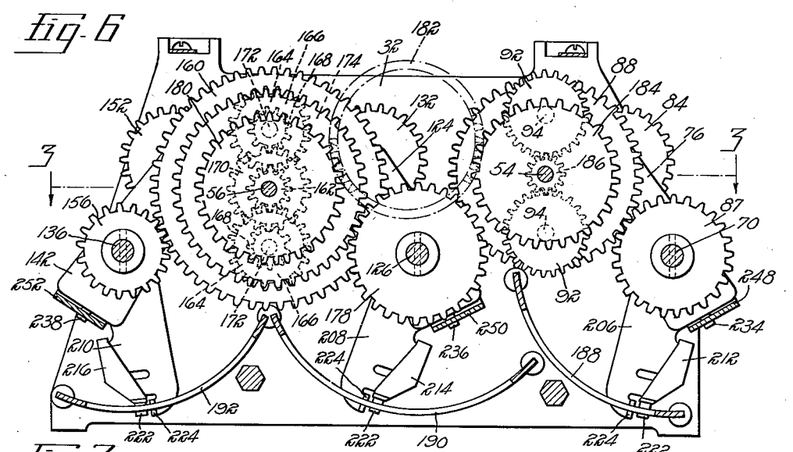
Figure 6 is an enlarged vertical sectional elevation through a portion of the differential mechanism and setting quadrants or combs, the same being taken substantially in the plane as indicated by the line 6—6 of Figure 3.

In the present type of apparatus, said meter shaft would be connected to the coupling 20 provided on a jack shaft, said jack shaft having a gear 21 meshing with gear 22 provided on the driving shaft 23. The driving shaft 23 is suitably journaled in bearings 24 and 26 provided on the frame 28, said frame being supported on the back plate 30 of the variator, said back plate being spaced from and connected to the front plate 32 of the variator support. The shaft 23 is adapted to rotate in a counter-clockwise direction, as viewed in Figure 3, and is provided with the ratchet member 34 provided with the teeth 36 adapted to have cooperative engagement with the pawl 38 pivoted as at 40 to the frame 28, said pawl contacting the teeth 36 to prevent rotation of the shaft 23 in a clockwise direction, particularly while the counter or register is being reset to zero. The shaft 23 is provided with the beveled gear 42, which meshes with the beveled gear 44, said beveled gear 44 being provided on the shaft 46 and being integral with the gear 48. The gear 48 meshes with the gears 50 and 52 non-rotatably mounted on shafts 54 and 56, said shafts extending through suitable bearings 58, 60, 62 and 64 provided on said front and back plates.

The shaft 54 is provided with the gear cone 66 which, as shown, is provided with four steps, and, in the embodiment illustrated, is for tenths of cents. The shaft 56 is provided with the gear cone 68 which, in the embodiment shown, is provided with eleven gear steps and is adapted to compute in cents and tenths of cents. It is, of course, understood that while these cones as shown are for domestic currency they may be readily applicable to foreign currency or for other ratios of computation. The supplementary shaft 70 is disposed in parallel relation to the shaft 54, being provided with the longitudinal keyway 72 which is adapted to form a slidable but non-rotatable connection between said shaft 70 and the gear 74, said gear 74 being disposed between the spaced plates 76 and 78 connected together and in turn connected to the sliding setting tube or shaft 80, said shaft extending outwardly through the boss 81 and being provided with the handhold 82. The gear 74 meshes with the gear 84, pivoted as at 86 to the plates 76 and 78, the gear 84 being adapted to engage a selected step of the cone 66. The shaft 70 is provided with the gear 87 which may be recessed for accommodating a boss of the plate 76, the gear 87 being non-rotatably mounted on shaft 70 and meshing with the gear 88 rotatably mounted on the shaft 54 as through the bearing 90. The gear 88 is provided with the stepped pinions 92, said pinions being pivotally mounted as at 94 on said gear 88, the smaller step 96 of said pinions being geared as at 98 to the pinion 100, pinion 100 being non-rotatably connected to the gear 102, also rotatably mounted on the shaft 54. The gear 102 is adapted to be geared to the shaft 104 extending upwardly, being provided with the gear 106, which is connected through a suitable gear train 108 to the upper money banks of numeral wheels 110 exposed in the windows 112 for indicating the cost of the liquid dispensed, the numeral wheels of the various banks of wheels being connected by suitable transfer mechanism and being adapted to be reset by suitable reset mechanism, the reset connection being illustrated generally at 114.

The cent or money unit of setting is accomplished by means of a sliding setting tube 116 provided with the handhold 118, and extending through the boss 120 provided in the front plate 32. The tube 116 is provided with the connected spaced plates 122 and 124, all slidably mounted on the supplementary shaft 126 disposed in parallel relation to the shaft 56. The shaft 126 is slidably keyed as at 128 to the gear 130, and gear 130 meshes with the gear 132 pivoted as at 134 to the plates 122 and 124, said gear 132 being adapted to engage the selected step of the gear cone 68. The tenths supplementary shaft 136 is mounted in parallel relation to the shaft 56 and is provided with the keyway 138 non-rotatably but slidably connecting said shaft to the gear 140 mounted between the spaced plates 142 and 144 provided on the sliding setting tube 146 extending through the boss 148, tube 146 being provided with the handhold 150. It will be seen that the sliding setting tubes are in substantially horizontal alignment. The gear 140 meshes with the gear 152 pivotally connected as at 154 to the spaced plates 142 and 144, and is adapted to be moved into selective engagement with the steps of the gear cone 68.

The shaft 136 is provided with the gear 156 non-rotatably mounted thereon and meshing with the gear 160 rotatably mounted on the shaft 56. The gear 160 is provided with the gear 162 rotatable therewith and meshing with the gear step 164 of the stepped pinion 166, the other step 168 of said pinion meshing with the gear 170 rotatably mounted on the shaft 56. The stepped pinion 166 is pivoted as at 172 to the gear 174 which is rotatably mounted on the bearing 176 provided on the shaft 56, said gear meshing with the gear 178 non-rotatably mounted on the shaft 126. The motion imparted to the supplementary shafts 126 and 136 is thus added through the differential gearing. The gear 170 is non-rotatably connected to the gear 180, which in turn meshes with the gear 182 rotatably mounted on the shaft 46 and meshing with the gear 184 rotatably mounted on the shaft 54. The gear 184 is provided with the gear 186 which in turn meshes with the gear 92 so that the complete motion is added through the two differentials to the gear 102.

The quadrants or combs 188, 190 and 192 of the setting mechanism are provided adjacent the supplementary shafts 70, 126 and 136, and are provided with the inclined faces 194, 196 and 198 and, opposite said faces, with suitable notches 200, 202 and 204 corresponding to the calibrated selected price for each of the cones. In order to set any sliding setting tube it is first bodily moved outwardly to disengage the teeth of the respective gears 84, 132 or 152 from the respective cones; that is, a motion of translation is imparted to those gears. The handhold may then be suitably rotated to the selected position and the gears 84, 132 or 152 dropped into position in engagement with the selected gear steps. In order to insure that there be proper engagement the plates 76—78, 122—124, 142—144 are provided with the arms 206, 208 and 210, said arms being provided with the pivoted supplementary arms 212, 214 and 216, said arms being supplementarily pivoted as at 218 and urged toward the inclined faces 194, 196 and 198 by means of the springs 220, suitable rollers 222 being provided on said supplementary arms to permit ready movement along the inclined planes. Thus, if, for example, the gear 84 does not quite mesh with the selected gear step of the cone 66, the spring 220 will tend normally to urge the gears toward each other into mesh, and when they drop into mesh the projection 224 provided on the respective plates will drop into the selected notches 200, 202 or 204.

The pawls 226 are pivoted as at 228 to the plates 76—78, 122—124, 142—144, being urged by means of a spring 230 to a position to engage the teeth of the gears 74, 130 or 140, respectively, so that the supplementary shafts 72, 126 and 136 may be locked against rotation, i. e., in zero computing position, unless the gears 84, 132 and 156 are engaged with the gear cone. The pawls 226 are resiliently urged to engaging position, but are positively moved out of engagement with the respective gears by means of the abutments 232 on the supplementary arms 212, 214 and 216, the springs 230 being pivoted to said pawls 226 and to said abutments. The abutments 232 do not move the pawls 226 out of engagement to their respective gears unless the members 224 are in full engagement with the respective slots 200, 202 and 204.

The plates 76—78, 122—124 and 142—144 are provided with the pins 234, 236 and 238 engageable in the longitudinal slots 240, 244 and 246 of the bails 248, 250 and 252, said bails being rotatably mounted and positioned on the supplementary shafts 70, 126 and 136, the front end of said bails being provided with the gear segments 254, 256 and 258, said gear segments meshing with the gears 260, 262 and 264. The gear 260 is pivotally mounted as at 266 to the front plate 32 and meshes with the gear 268 provided on the jack shaft 270 journaled on the front plate 32, said jack shaft 270 being provided with the beveled gear 274 meshing with the beveled gear 276 provided on the daily price number wheel provided on the tens number wheel 278. The shaft 270 is provided with the flexible shaft 280 which extends substantially diagonally across the variator and is connected to the jack shaft 282 which, in turn, is provided with beveled wheel 284 meshing with the beveled gear 286 provided on the tens daily price number wheel 288.

The number wheels 278 and 288 are pivotally mounted on the supporting shafts 290 and 292 disposed on opposite sides of the variator in the recesses 294 and 296. The gear 256, as has already been explained, meshes with the gear 262 which in turn is non-rotatably mounted on the jack shaft 298, the shaft 298 being provided with beveled gear 300 meshing with the beveled gear 302 provided on the unit (or cent) numeral wheel 304, likewise rotatably mounted on the supporting shaft 290. The shaft 298 is connected with the flexible shaft 306 which extends across the variator and is connected to the jack shaft 308 provided with the beveled gear 310, which in turn meshes with the beveled gear 312 provided on the unit numeral daily price wheel 314 rotatably supported on the shaft 292. The gear 258, as has already been described, meshes with the gear 264 which is pivoted as at 316 to the front plate 32 and in turn meshes with the gear 318 provided on the jack shaft 320, said shaft being provided with the beveled gear 322 meshing with the beveled gear 324 provided on the tenths numeral wheel 326 rotatably supported on the shaft 290. The shaft 320 is provided with a flexible shaft 328 extending substantially across the variator and connected to the jack shaft 330, said shaft being provided with the beveled gear 332 meshing with the beveled gear 334 provided on the tenths daily price numeral wheel 336 which is rotatably supported on the shaft 292.

It will thus be seen that the daily price wheels will readily indicate the setting of the variator, being operated from the handholds through the bails, the gear segments, and their respective connections to the daily price numeral wheels.

In order to provide a connection for the registering means operated directly from the driving shaft 23, said shaft is provided with the gear 338 adapted to drive the numeral wheels 340 disposed in the window 342. In the device shown, such registration would indicate the number of gallons dispensed, the wheels being disposed in the usual tens, units and fractions of a gallon, suitable transfer mechanism being disposed between the wheels. The wheels are connected to the set-back mechanism 114, and are driven from the gear 338, as indicated generally, by the shaft 344 and the connection 346, which in turn drives the banks of wheels on each side of the register through suitable driving connections.

In the operation of this device, assuming the daily price indicating wheels 278, 304, 326, and 288, 314 and 336 to be in zero position, it will be understood that the gears 84, 132 and 152 will be disengaged from the gear cones 66 and 68, in which event the pawls 226 will be in engagement with the gears 74, 130 and 140, preventing rotation of the supplementary shafts 70, 126 and 136. If then the shaft 23 is rotated, only the amount numeral wheels 340 will be operated. In order to set the device to a selected price the handholds 82, 118 and 150 are moved to the selected position as determined by the rotation of the daily price wheels, it being understood that movement of said handholds moves the gear segments 254, 256 and 258 to operate said daily price indicating wheels.

Figure 7:
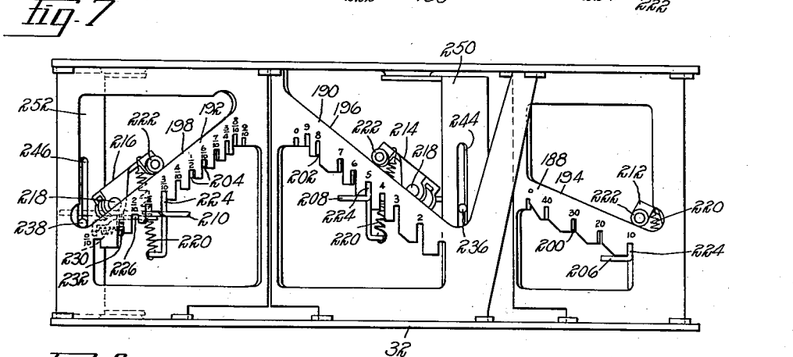
Figure 7 is an enlarged side elevation of the combs and portion of the shifting mechanism of the mechanism shown in Figure 6.
Figure 8:
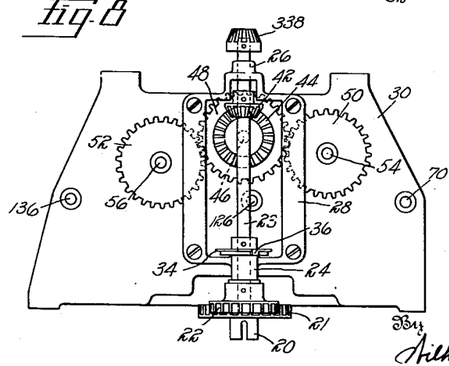
Figure 8 is a vertical end elevation of the drive shaft, the same looking toward the right as viewed in Figure 3.
Figure 9:
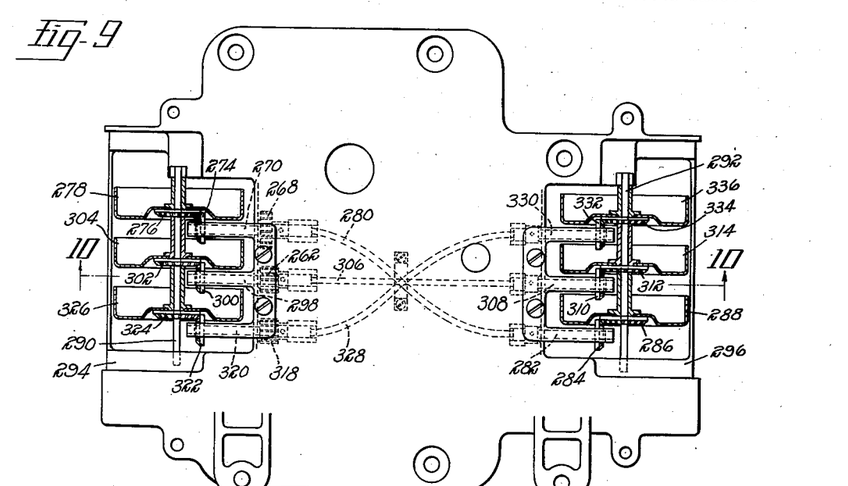
Figure 9 is a top plan view, partly in section, showing a portion of the daily price synchronizing means and the connection between the numeral wheels thereof on opposite sides of the computing head.
Figure 10:
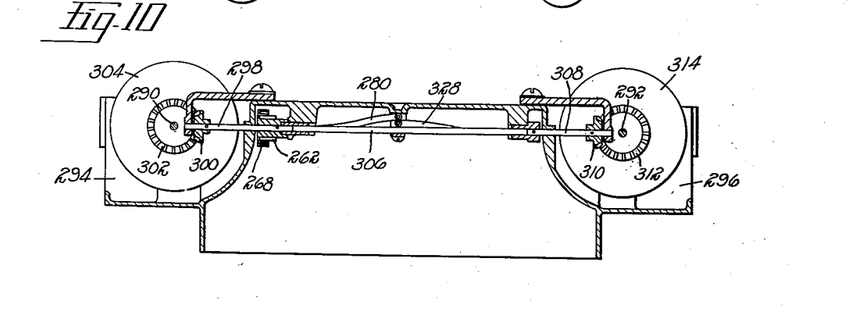
Figure 10 is a transverse sectional elevation taken substantially in the plane as indicated by the line 10—10 of Figure 9.

The comb 188 is provided with five notches corresponding, in the embodiment shown, to 10, 20, 30, 40 and 50 units respectively. The cone 190 is provided with ten notches corresponding to increments from one cent to ten cents in increments of one cent. The cone 192 is provided with twelve notches corresponding to increments from .0 to .9¢ in increments of .1¢ and, in addition, increments of .25¢ and .75¢. Thus, if it were decided to set the device for 15.3¢, the members 224 would be disposed in notches as indicated in Figure 7, it being seen that the graduations increase from the lower right toward the upper left as viewed in said figure.

If, in setting the device, any of the members 224 do not fully seat within the selected notches, that is, should any of the gears 84, 132 and 152 not fully mesh with the selected steps of the cones 66 or 68, the springs 220 will urge said gears into fully meshed position, i. e., in operation the gears 84, 132 and 152 always tend to walk into engagement with the cone gears.

Operation of the shaft 23, as by dispensing of liquid, will cause direct operation of the numeral wheels 340 through the connections 338, 344 and 346. Additionally, the gear 44 will be rotated by the gear 42, causing rotation of the shafts 54 and 56, which will transmit motion through the gear steps to the supplementary shafts 70, 126 and 136, which motion will be added through the differential gearing in the manner already described, the final summation being transmitted to the gear 102 which is connected through the shaft 104 and gearing 106 and 108 to the price indicating numeral wheels 110.

It is to be understood that we do not wish to be limited by the exact embodiment of the device shown, which is merely by way of illustration and not limitation as various and other forms of the device will of course be apparent to those skilled in the art without departing from the spirit of the invention or the scope of the claims.

What is claimed is:

1. In a device of the character described, the combination of a vertically disposed drive shaft, means on said shaft for preventing rotation of said shaft in more than one direction, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear on one of said cone shafts, and differential means disposed on said cone shafts and driven by the adjacent supplementary shafts for driving said drive gear.

2. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear on one of said cone shafts, differential means disposed on said cone shafts and driven by the adjacent supplementary shafts for driving said drive gear, and means for shifting each of said shiftable gears.

3. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage respective gears on the cone shafts, a drive gear on one of said cone shafts, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them.

4. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage respective gears on the cone shafts, a drive gear on one of said cone shafts, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts.

5. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear on one of said cone shafts, differential means disposed on said cone shafts and driven by the adjacent supplementary shafts for driving said drive gear, means for shifting each of said shiftable gears, and means for indicating the engaged positions of said shiftable gears.

6. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear on one of said cone shafts, differential means disposed on said cone shafts and driven by the adjacent supplementary shafts for driving said drive gear, means for shifting each of said shiftable gears, means for indicating the engaged positions of said shiftable gears, said means including a bail rotated by rotation of the shifting means, and indicating means rotated by said bail.

7. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage respective gears on the cone shafts, a drive gear on one of said cone shafts, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them, and means for indicating the engaged positions of said shiftable gears.

8. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage respective gears on the cone shafts, a drive gear on one of said cone shafts, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, and means for indicating the engaged positions of said shiftable gears.

9. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage respective gears on the cone shafts, a drive gear on one of said cone shafts, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them, means for indicating the engaged positions of said shiftable gears, said means including a bail rotated by rotation of the shifting means, and indicating means rotated by said bail.

10. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage respective gears on the cone shafts, a drive gear on one of said cone shafts, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means for indicating the engaged positions of said shiftable gears, said means including a bail rotated by rotation of the shifting means, and indicating means rotated by said bail.

11. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplemental shafts disposed to selectively engage the respective gears on the cone shafts, a drive gear on one of said cone shafts, and differential means disposed on said cone shafts and driven by the adjacent supplementary shafts for driving said drive gear.

12. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, and differential means disposed on said cone shafts and driven by the adjacent supplementary shafts for driving said drive gear.

13. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, and means for shifting each of said shiftable gear.

14. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, and means for shifting each of said shiftable gears, said means including a member rotatable to disengage and engage the shiftable gears from the gears on the cone shafts engaged by them.

15. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, and means for shifting each of said shiftable gears, said means including a member rotatable to disengage and engage the shiftable gears from the gears on the cone shafts engaged by them and slidable to different positions to engage other selected gears on said cone shafts.

16. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means for indicating the engaged positions of said shiftable gears, said means including a bail rotated by rotation of the shifting means, and indicating means rotated by said bail.

17. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, and means disposed adjacent said supplementary shafts for preventing disengagement of said shiftable gears from the selected gears on the cone shafts.

18. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means disposed adjacent said supplementary shafts for preventing disengagement of said shiftable gears from the selected gears on the cone shafts, said means including fixed members having recesses corresponding to the gears on said cone shafts, and means on said shifting means engageable in said recesses when the shiftable gears are in engagement with the selected gears on said cone shafts.

19. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means disposed adjacent said supplementary shafts for preventing disengagement of said shiftable gears from the selected gears on the cone shafts, said means including fixed members having recesses corresponding to the gears on said cone shafts, means on said shifting means engageable in said recesses when the shiftable gears are in engagement with the selected gears on said cone shafts, and means for locking the supplementary shafts against rotation unless said last named means is in said recesses.

20. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means disposed adjacent said supplementary shafts for preventing disengagement of said shiftable gears from the selected gears on the cone shafts, said means including fixed members having recesses corresponding to the gears on said cone shafts, means on said shifting means engageable in said recesses when the shiftable gears are in engagement with the selected gears on said cone shafts, and means for urging said shiftable gears toward engaged position with the selected gear on said cone shaft.

21. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means disposed adjacent said supplementary shafts for preventing disengagement of said shiftable gears from the selected gears on the cone shafts, said means including fixed members having recesses corresponding to the gears on said cone shafts, means on said shifting means engageable in said recesses when the shiftable gears are in engagement with the selected gears on said cone shafts, means for locking the supplementary shafts against rotation unless said last named means is in said recesses, and means for urging said shiftable gears toward engaged position with the selected gear on said cone shafts.

22. In a device of the character described, the combination of a vertically disposed drive shaft, a pair of parallelly disposed cone shafts connected to said drive shaft, gears fixedly mounted on said cone shafts, each of said gears on each cone shaft being of different diameter from the other of said gears on the respective cone shafts, supplementary shafts disposed adjacent said cone shafts, shiftable gears for driving said supplementary shafts disposed to selectively engage the respective gears on the cone shafts, a drive gear, differential means disposed on said cone shafts and driven by the adjacent supplementary shafts for driving said drive gear, means for shifting each of said shiftable gears, said means including a member rotatable to disengage and engage the shiftable gears from the gears on the cone shafts engaged by them and slidable to different positions to engage other selected gears on said cone shafts, means disposed adjacent said supplementary shafts for preventing disengagement of said shiftable gears from the selected gears on the cone shafts, said means including fixed members having recesses corresponding to the gears on said cone shafts, means on said shifting means engageable in said recesses when the shiftable gears are in engagement with the selected gears on said cone shafts, means for locking the supplementary shafts against rotation unless said last named means is in said recesses, means for urging said shiftable gears toward engaged position with the selected gears on said cone shafts, means for indicating the engaged positions of said shiftable gears, said means including a bail rotated by rotation of the shifting means, and indicating means rotated by said bail.

HARVEY L. SPAUNBURG.
EDWARD A. SLYE.